United States Patent [19]
Kurhajec

[11] B 3,916,050
[45] Oct. 28, 1975

[54] POLYURETHANE SANDBLAST STENCIL

[75] Inventor: George A. Kurhajec, North Oaks, Minn.

[73] Assignee: Minnesota Mining and Manufacturing Company, St. Paul, Minn.

[22] Filed: Nov. 15, 1972

[21] Appl. No.: 306,938

[44] Published under the Trial Voluntary Protest Program on January 28, 1975 as document no. B 306,938.

[52] U.S. Cl. .............. 428/40; 51/262; 427/289; 428/262; 428/425
[51] Int. Cl.² ............................................ B24B 1/00
[58] Field of Search .......... 51/262, 311, 312, 262.1; 260/18 N, 37 N, 28; 161/190, 167, 406; 117/8.5; 428/40, 262, 425; 427/289

[56] References Cited
UNITED STATES PATENTS

| | | |
|---|---|---|
| 3,201,136 | 8/1965 | Harrison et al. ............. 260/77.5 AB |
| 3,492,255 | 1/1970 | Cobbledick ................... 260/18 TN |
| 3,579,926 | 5/1971 | Gaspari ............................... 51/312 |
| 3,583,945 | 6/1971 | Robins ........................ 260/77.5 AB |
| 3,592,787 | 7/1971 | Robins ............................. 260/37 N |
| 3,714,110 | 1/1973 | Verdol et al. .................... 260/37 N |

FOREIGN PATENTS OR APPLICATIONS 757,807   5/1967   Canada

*Primary Examiner*—George F. Lesmes
*Assistant Examiner*—R. J. Roche
*Attorney, Agent, or Firm*—Alexander, Sell, Steldt & DeLaHunt

[57] ABSTRACT

Sheet material for making sandblast stencils is simply and predictably prepared by blending polyurethane forming components and kaolin or simiarly reinforcing filler. A small amount of wax is preferably incorporated to improve cuttability. Such structures typically have on one face a layer of pressure-sensitive adhesive protected by a removable liner.

8 Claims, 2 Drawing Figures

POLYURETHANE SANDBLAST STENCIL

BACKGROUND OF THE INVENTION

This invention relates to laminar sheet materials having particular utility for use as sandblast stencils, comprising a self-supporting rubbery layer of filled polyurethane resin coated on one major surface with a pressure-sensitive adhesive.

For several decades sandblast stencils have been used to facilitate the inscribing of hard surfaces, such as granite, marble, glass, brick, concrete, wood or hard thermoset plastics. These stencils, which are formed from abrasion-resistant sheet material by using either dies or a knife to cut out the areas to be inscribed, are adhered to the desired surface and thereafter subjected to a stream of fast-moving abrasive particles. The exposed portion of the surface is abraded away, while the covered portions are unaffected.

The sandblast stencils described in Wartha U.S. Pat. Nos. 2,393,668 and 2,410,472 have proved to be immensely useful in the field of sandblasting inscriptions, designs, characters, and the like on hard surfaces. Stencils of the type Wartha describes, however, are difficult to manufacture. Natural rubber is first milled and mixed with a filler, after which the entire mass is milled further until it is homogenized, a total of perhaps ten separate process steps being required. Various synthetic rubbers have been substituted for, or blended with, natural rubber during the past thirty years, but the preparation of sandblast stencils have remained both tedious and dependent on the experience and skill of the rubber compounder.

Advances in synthetic resin chemistry and compounding over the past quarter century would seem to indicate that a sandblast stencil could be made by coating or casting a curable mass of liquid, flowable or semi-solid polymer and curing it to form the blast-resistant material, a vastly simplified manufacturing procedure as compared to the prior art. The application of modern synthetic resin technology to the manufacture of sandblast stencils does not, however, follow any predictable course. While the prior art compounding procedure involved milling a rubber with a filler, two-part polyurethane technology is based on chemically designing a reactive system which will provide the desired ultimate physical properties after curing. Several factors have to be considered and explored, virtually on a trial-and-error basis, and there is no real assurance that a satisfactory product can ever actually be obtained.

First, can starting materials be selected so as to provide ultimately desired physical properties with or without the use of a filler? Second, if a filler is desirable, should it be a mere extender? A filler that serves some undefined function? A filler which provides reinforcement? A filler which is chemically inert with respect to the starting materials? How much filler must be incorporated? The answers to these questions are certainly not to be found in the prior art, which acknowledges that the filling and extending of synthetic resins is more art than science; see Hunt, "How to Select Fillers and Reinforcements for Thermoplastics", Plastics Technology, pages 33–43 (November, 1969).

Thus, to the best of our knowledge and belief, all commercially effective sandblast stencils have heretofore been made by the same general rubber compounding technique taught by Wartha. The present invention represents a sharp break with the traditional product and its method of manufacture.

SUMMARY

It has been found extremely difficult either to formulate or to select polyurethane-forming starting materials which alone, without reinforcement, will consistently provide an early cuttable blast-resistant backing sheet for a sand-blast stencil. The present inventors have empirically learned that a simpler and more effective approach is to add to the starting materials reinforcing fillers which will impart the necessary properties to the cured polyurethane mass, provided that the starting materials meet certain criteria with regard to (a) OH:NCO ratios, (b) the urethane group concentration that will result after curing of the starting materials, and (c) the hypothetical molecular weight between crosslinks in the resulting cured product. If these empirically established criteria are observed, the cooperative combination of the reinforcing filler and the cured polyurethane matrix will form a self-supporting rubbery layer possessing a complex set of physical properties well suited to the requirements of sandblast stencils and other fields of use requiring high abrasion resistance.

The polyurethane-forming starting materials should be selected such that the OH:NCO ratio is in the range of about 0.9 to 1.6, preferably 1.0–1.4. The starting materials should also be selected such that, in the cured polyurethane matrix, the average number of urethane groups per 1,000 grams of polymer will be in the approximate range of 0.9 to 1.8 and the hypothetical (i.e., calculated number average) molecular weight between crosslinks, based on a stoichiometric OH:NCO ratio, will be in the approximate range of 2,000 to 10,000. If the average number of urethane groups exceeds 1.8 or if the hypothetical molecular weight falls significantly below 2,000, the ultimate product will be brittle, hard to use, and subject to failure when subjected to sandblasting. On the other hand, if the average number of urethane groups falls below 0.9, or if the hypothetical molecular weight substantially exceeds 10,000, the product will be soft and subject to cold flow under conditions of use. Products falling outside the specified ranges lack those properties which permit maintaining careful control of dimensions and shapes of a design being sandblasted.

The polyurethane-forming starting materials are stored as a two-part system, preferably with the smallest amount of solvent conveniently usable, and the two parts are mixed and applied to a moving adhesive-coated web. Part A of the two-part system, for example, comprises active hydrogen-containing materials such as diols or triols, while Part B comprises isocyanate-containing materials such as isocyanate-terminated prepolymers. One or both of the reactants should provide for a degree of crosslinking in the final product, typically by providing one or more trifunctional components. In the absence of filler, the cured polyurethane is fairly tough and rubbery.

The reinforcing filler, which is a highly significant part of the invention, may be chemically bonded, or at least chemically attracted, to the urethane matrix in which it is entrapped. In any event, the attraction between the surface of a filler particle and the surrounding cured polyurethane resin appears to be stronger than van der Waals forces. A simple way to determine whether a putative filler is "reinforcing" involves the preparation of identical 1-inch × 6-inch × 0.040-inch test castings from the same polyurethane-forming reactants, incorporating no filler in one batch and 30 volume percent filler in the other batch. Tensile tests are then run on the two castings; if the tensile strength of the filler-containing sample exceeds that of the unfilled sample, the filler is deemed reinforcing. If desired, some non-reinforcing filler may also be included, in addition to (but not as a total replacement for) the reinforcing filler.

In making filled two-part polyurethanes, the filler is preferably added to Part A in the amount of about 30 to about 70 percent by weight, preferably 40 – 60 percent; assuming a polyurethane density of 1.2 and a filler density of 2.6, the ultimate blast-resistant layer will then contain about 15–50 percent filler, preferably 20–40 percent, by volume. Kaolin, which is a hydrated aluminum silicate, the particles of which are less than 6 microns in diameter and predominantly less than 2 microns in diameter, is the presently preferred filler. The resulting filled elastomeric sheet material can have any appropriate thickness, e.g., 20 – 200 mils, 40 mils being typical.

The components of sandblast stencil formulations of the invention are interrelated in the physical properties imparted, and changes can be effected by varying one or more components. For example, a product which is too soft may be hardened by increasing the degree of crosslinking, incorporating more filler, or both.

BRIEF DESCRIPTION OF THE DRAWING

The invention can be more clearly understood with reference to the accompanying drawings, in which like numerals refer to like parts in the several views, and in which.

PERFORMANCE AND QUALITY CONTROL TESTS

Figure 1:
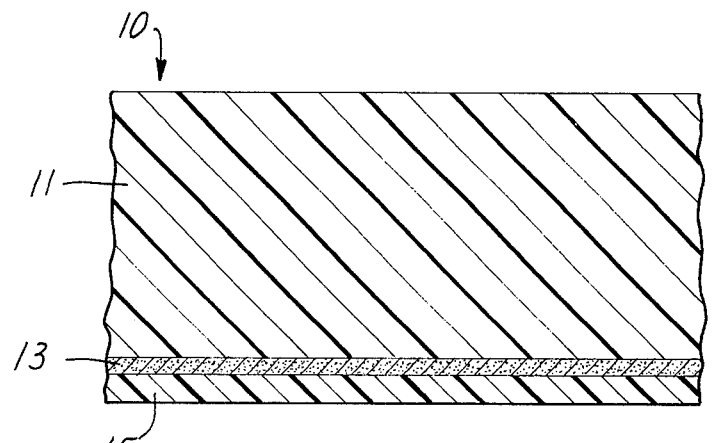
FIG. 1 is a cross-sectional view, greatly enlarged, of a portion of a sheet material made according to this invention.

An excellent indication of how a sandblast stencil will perform may be obtained by means of a test simulating typical field conditions. A granite slab, having a polished, smooth, flat surface 2 inches × 2¾ inches, is carefully cleaned and inspected to make sure that it is free of dust, oil, or other contaminants. A sheet of sandblast stencil material, approximately the same size as the slab surface, is then adhered thereto and forced into intimate contact by means of a hand roller. A thin steel template is placed over the stencil material, the template containing a cut-out portion, about 1 inch wide and 1¾ inches high, corresponding generally to the diagonal and one vertical stroke of an upper case letter "N". The vertical stroke, which is 1 mm wide, intersects the outer side of the triangular diagonal stroke at an angle of approximately 30°. The diagonal stroke is generally triangular, its base being ½ inch wide, and its two sides, if extended, would intersect at about 10°; the upper portion of the "peninsula" between the adjacent sides of the diagonal and vertical strokes is, however, truncated at a location approximately 1¼ inch above the base, the line of truncation extending at approximately 70° to the vertical stroke. A conventional sandblast stencil knife is then used to cut along the area delineated by the template and the cut-out portion then removed. During this procedure the operator carefully observes any tendency of the stencil to tear, not to cut cleanly, etc.

After the test sample has been prepared as described in the preceding paragraph, it is subjected to a line closure and blast resistance test. Using air at a line pressure of 95 – 105 psi and a ⅜-inch tungsten carbide nozzle, grade 36 aluminum oxide particles are directed toward the stencil and the exposed portion of granite. The nozzle is maintained at about 6 inches from the surface and moved continuously until granite has been removed in the exposed areas to a depth of approximately ½ inch. The stencil is then carefully inspected under magnification to evaluate line closure or erosion. If the width of the vertical stroke, which was initially 1 mm wide, has decreased excessively (− reading), it indicates that the stencil is too soft, while if it has become significantly wider (+ reading), it indicates that the material is insufficiently abrasion-resistant. Other visual inspection will reveal surface wear or chipping away of line edges, especially at the tip of the peninsula between the diagonal and vertical strokes. Ratings are assigned as follows: ± 5 percent, excellent; ± 10 percent, very good; ± 15 percent good; ± 20 percent, acceptable; ± 25 percent, poor.

The stencil is now removed from the granite test piece; there should be no tearing of the stencil, which would not only prove inconvenient and annoying to the operator but also would essentially preclude any possibility of re-using the stencil.

A more quantitative way of evaluating ease of cutting a sandblast stencil involves adhering a 2-inch × 8-inch sample to the surface of a clean glass plate, positioning a sharpened stencil knife so that its axis is normal to the surface of the stencil, subjecting the knife to a load of 1400 grams, and measuring the force required to pull the blade through the stencil, parallel to the surface, at 90 inches per minute. The force in excess of that required merely to pull the knife along the glass plate in the absence of the stencil, should not exceed 40 ounces for 40–50 mil stencil material. Ease of cut is significantly enhanced if a small amount of lubricant, e.g., up to 5 percent by weight (10 percent by volume) of a paraffin wax having a melting point in the range of 100°–150°F. is included in the stencil-forming composition; a volume percentage wax in the range of 5–10 percent is preferred. Heavy oils likewise improve cuttability of the stencil, but they tend to bloom to the surface and hence may be undesirable additives in some circumstances.

A more quantitative measure of tear resistance utilizes a test sample strip which is 4 inches long, the 1¼ inch constituting the distal portion of each of the two ends being aligned and ¾ inch wide. The portion of the strip intermediate the two ends has one smoothly curved edge protruding laterally about ½ inch and one edge formed by lines intersecting at 90°, the apex of angle of intersection being ½ inch from the extremity of the curved edge and radially inward with respect thereto. When the opposite ends of this strip are clamped in the jaws of a tensile machine and the jaws separated at 12 inches per minute, the strip inevitably tears at the apex of the 90° angle; the force required to cause failure should be in the approximate range of 1–4 lbs. This test is useful as an aid to quality control.

For a given stencil formulation, other conventional quality control tests are helpful in monitoring consistency and predicting performance of the product. For example, the Shore A-2 hardness (measured using a sufficient number of layers to attain a thickness of 100 mils or more, positioned on a plate glass support), should be in the range of 30 – 75, preferably 45 – 70. The elongation at break (run at 12 inches per minute) should be on the order of 100–1000 percent at an ultimate tensile strength of 5–40 lbs. per inch width, a value within the range of 10–30 lbs. being preferred.

DESCRIPTION OF PRESENTLY PREFERRED EMBODIMENTS

Turning to FIG. 1, sheet material 10 is particularly well suited for use as a sandblast stencil and comprises an elastomeric backing sheet 11, a pressure-sensitive adhesive layer 13, and release liner 15 (e.g., a polymeric film or paper backing provided with a silicone release coating) for the pressure-sensitive adhesive layer 13. Backing sheet 11 comprises a cured polyurethane formulated according to the teachings of this invention, and therefore containing a reinforcing filler dispersed in the polyurethane matrix. Psa layer 13 can be coated directly onto a major surface of backing sheet 11 by techniques conventional in the art. Preferably, however, psa layer 13 is coated onto release liner 15. In use, sheet material 10 can be cut to form a stencil by machine (e.g., die cutting) or by hand with a sharp knife. The knife or die can be forced into sheet 10 either from the exposed surface of release liner 15 or from the exposed surface of backing sheet 11. Preferably, the exposed surface of release liner 15 is placed against a hard surface and the knife or die cuts into the exposed surface of backing sheet 11. Alternatively, release liner 15 can be removed, exposing psa layer 13, which can then be adhered to the surface to be sandblasted, so that the stencil can be cut in place. The latter method is especially suited to the embodiment of the invention shown in FIG. 1. The portions of backing sheet 11 which are removed after cutting are the open areas which allow the stream of sand to inscribe a pattern on the surface otherwise protected by tough, blast-resistant backing sheet 11.

Figure 2:
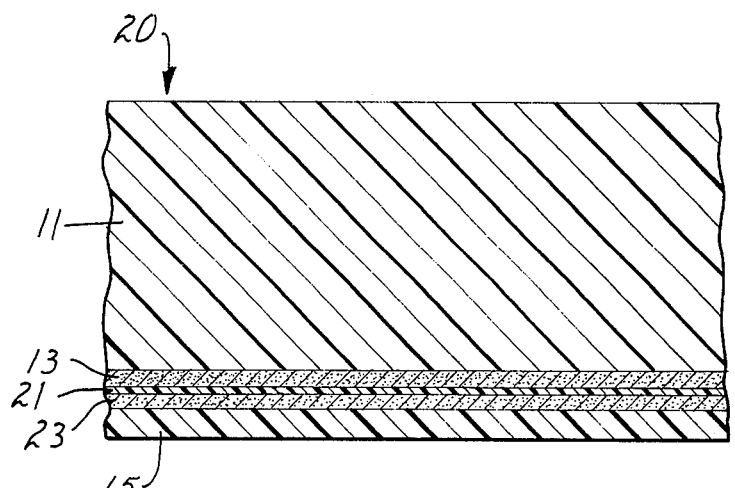
FIG. 2 is a cross-sectional view drawn to the same scale as FIG. 1, showing a portion of an alternative form of sheet material made according to this invention.

FIG. 2 illustrates a more complex sheet material 20, which is especially adapted for die cutting. The die is forced into the exposed surface of backing sheet 11, cutting through this sheet and adhesive layer 13 as far as polymeric film 21, which is preferably biaxially oriented polyethylene terephthalate or the like, a material which is strong but which has little or no sandblast resistance. A second psa layer 23 is adhered to the under surface of film 21, and release liner 15 is the outermost lamina of the combination. The lamination of sheet 20 can be carried out in a manner analogous to the method of making sheet 10; that is, film 21 is suitably primed, if necessary, coated with psa layer 23, laminated to release liner 15, and the second psa layer 13 then coated on film 21. Backing sheet 11 can then be formed in situ by casting and curing the filled, two-part polyurethane-forming system. In use, sheet 20 is cut as described in the shop or factory and brought to the job, where release liner 15 is removed and the stencil adhered to the surface to be sandblasted.

It is believed that understanding of the invention will be facilitated by referring to the following illustrative but non-limiting examples, in which all parts and percentages are by weight unless otherwise noted.

EXAMPLE 1

The following components were charged into a resin kettle and the resultant mixture heated to about 100°C. while stirring:

|  | Parts by weight |
|---|---|
| Polypropylene glycol, molecular weight 2000, hydroxyl value 56 | 1000 |
| Butylated hydroxy toluene (antioxidant) | 10 |
| Calcium octoate (wetting agent) | 6.25 |

While continuing to heat and stir the mixture, 1,223 parts of kaolin clay was added in several increments. An aspirator was then used to evacuate the kettle to a pressure of about 15 mm Hg., and stirring continued at 100°C. until any water present was removed. The vacuum was then released, heating discontinued, and 8.75 parts phenyl mercuric acetate catalyst added and stirred into the mixture. The resulting composition was designated "Part A".

An isocyanate-terminated prepolymer, having an isocyanate equivalent weight of about 175, was prepared by reacting the following components:

| Toluene diisocyanate | 86.7 |
|---|---|
| Propylene oxide based triol, hydroxyl value 137 | 6.0 |
| Trimethylol propane | 7.3 |

This prepolymer, which contained 31 percent available isocyanate, was designated "Part B".

To a mixing head were continuously metered 100 parts of Part A and 5.5 parts of Part B (OH:NCO ratio 1.1) and the resultant reactive blend coated, at a thickness of 42 mils, upon the exposed surface of a 2-mil layer of rubber-resin type pressure-sensitive adhesive carried on a silicone-coated release liner. The coated structure was then placed in a 225°F. oven for one minute, during which time Part A and Part B reacted to form a tough, resilient, blast resistant layer. It is believed that some of the NCO groups interacted with the adhesive, more firmly joining it to the blast-resistant layer.

The calculated composition of the blast-resistant layer was as follows:

| OH:NCO ratio | 1.1 |
|---|---|
| NCO groups per 1000 grams polymer | 1.19 |
| Average mol. wt. between crosslinks | 8,100 |
| Parts kaolin per 100 parts blast-resistant layer | 51.5 |

When subjected to the tests previously described, the product of this example performed as follows:

| Tensile strength, lbs/inch of width* | 12.2 |
|---|---|
| Elongation at break, %* | 192% |
| Tear resistance, lbs.* | 2.6 |

-Continued

| | |
|---|---|
| Hardness, Shore A-2 | 59 |
| Line closure | +14% |
| Cuttability, oz. | 33 |

*Average of length and width values

If desired, the structure of the product of this example can be varied by coating the Part A-Part B blend upon the adhesive coated surface of a biaxially oriented polyester film, which is in turn adhered to a removable release liner by a second pressure-sensitive adhesive. Stencils of this type are described in U.S. Pat. Nos. 2,292,996 and 3,579,926.

EXAMPLES 2 and 3

Using the formulating, blending and manufacturing procedures specified in Example 1, two sandblast stencils were prepared, the blast-resistant layer being formed from a 100:9.4 Part A:Part B blend in each case. Part A for Example 2 was the reaction product of the following components:

| | |
|---|---|
| Polypropylene glycol (per Example 1) | 1,000 |
| Propylene oxide-based triol, molecular weight 1500, OH value 112 | 800 |
| Butylated hydroxyl toluene | 14 |
| Calcium octoate | 10 |
| Kaolin | 2,190 |
| Phenyl mercuric acetate | 14 |

Part A for Example 3 was identical except for the inclusion of 168 parts of paraffin wax (straight chain alkyl hydrocarbon, nominal melting point 129°F.); i.e., it contained 4 percent wax by weight. Part B for both Examples 2 and 3 contained 24.3 percent available NCO and was the prepolymer reaction product of the following components:

| | |
|---|---|
| Toluene diisocyanate | 66.90 |
| Polypropylene glycol, mol. wt. 2000 | 17.32 |
| Tripropylene glycol | 15.78 |

The calculated composition of the blast-resistant layers were as follows:

| | Example 2 | Example 3 |
|---|---|---|
| OH:NCO ratio | 1.2 | 1.2 |
| NCO groups per 1000 grams polymer | 1.54 | 1.54 |
| Average mol. wt. between crosslinks | 2,800 | 2,800 |
| Weight percent kaolin in blast-resistant layer | 49.5 | 47.6 |
| Volume percent kaolin in blast-resistant layer | 32.2 | 30.1 |
| Weight percent wax in blast-resistant layer | 0 | 3.65 |
| Volume percent wax in blast-resistant layer | 0 | 6.45 |

When subjected to the tests previously described, the product of this example performed as follows:

| | Example 2 | Example 3 |
|---|---|---|
| Caliper, mils | 43 | 43 |
| Tensile strength, lbs/in width* | 19.6 | 14.7 |
| Elongation at break %* | 410 | 390 |
| Tear resistance, lbs* | 3.1 | 3.1 |
| Hardness, Shore A-2 | 62 | 58 |
| Line closure, % | 0 | 0 |
| Cuttability, oz. | 38 oz. | 20 |

*Average of length and width values

Although both the Example 2 and Example 3 stencils were eminently satisfactory, the Example 3 product was significantly easier to cut and hence easier to use.

What is claimed is:

1. In a laminar sandblast stencil sheet of the type comprising a filled self-supporting rubbery layer having a first pressure-sensitive adhesive layer on one side, the improvement wherein said filled rubbery layer is a polyurethane reaction product of components comprising (1) a mixture of polyols and polyisocyanates having an OH:NCO ratio in the range of about 1.0 to 1.2, and (2) a particulate kaolin filler, said filler constituting about 1/5 to about 1/3 the volume of said rubbery layer, said reaction product having an elongation at break on the order of 100 – 1000 percent, a tensile strength of 5 – 40 pounds per inch width, a tear resistance of 1.0 –4.0 pounds, a Shore A-2 hardness of 30–75, 0.9–1.8 urethane groups per 1000 grams of the polyurethane portion of said reaction product, and a molecular weight between urethane-containing crosslinks in the approximate range of 2000 to 10,000.

2. The stencil sheet of claim 1 wherein the kaolin constitutes about 1/3 the volume of the rubbery layer and the tensile strength of the rubbery layer is in the range of 10–30 lbs. per inch width.

3. The stencil sheet of claim 1 wherein the rubbery layer contains up to 10 volume percent lubricant to facilitate cutting.

4. The stencil sheet of claim 3 wherein the lubricant is a paraffin wax having a melting point in the range of 100°–150°F.

5. The stencil sheet of claim 1 wherein the first pressure-sensitive adhesive layer is protectively covered by a removable release liner.

6. The stencil sheet of claim 1 wherein a polymeric film is adhered to the exposed surface of said first pressure-sensitive adhesive layer and a second pressure-sensitive adhesive layer overlies said film, said second pressure-sensitive adhesive layer being protectively covered by a removable release liner.

7. The stencil sheet of claim 1 wherein the polyols comprise a diol and a triol.

8. The stencil sheet of claim 1 wherein the Shore A-2 hardness is in the range of 45–70.

* * * * *